United States Patent [19]
Baschant et al.

[11] Patent Number: 5,567,951
[45] Date of Patent: Oct. 22, 1996

[54] RADIATING APPARATUS

[75] Inventors: Dieter Baschant, Dessau; Heinz Gatzmanga, Köthen; Heinz Juppe, Dessau, all of Germany

[73] Assignee: Heraeus Noblelight GmbH, Hanau, Germany

[21] Appl. No.: 455,828

[22] Filed: May 31, 1995

[30] Foreign Application Priority Data

Jun. 1, 1994 [DE] Germany .................... 44 19 285.1

[51] Int. Cl.⁶ .................................................. A61N 5/06
[52] U.S. Cl. .................. 250/504 R; 250/495.1; 392/407; 219/553
[58] Field of Search .............. 250/504 R, 495.1, 250/493.1; 392/407, 409; 219/553, 552

[56] References Cited

U.S. PATENT DOCUMENTS

| 3,694,624 | 9/1972 | Buchta ................... 250/495.1 |
| 4,084,096 | 4/1978 | Edwards ................. 250/504 R |
| 4,271,363 | 6/1981 | Anderson ............... 250/504 R |
| 4,859,859 | 8/1989 | Knodle et al. ......... 250/504 R |
| 5,220,173 | 6/1993 | Kanstad ................. 250/504 R |
| 5,459,327 | 10/1995 | Nomura ................. 250/504 R |

FOREIGN PATENT DOCUMENTS

| 0495770 | 7/1992 | European Pat. Off. |
| 1773336 | 1/1972 | Germany. |
| 3437397 | 4/1986 | Germany. |
| 2233150 | 1/1991 | United Kingdom. |
| WO92/05411 | 4/1992 | WIPO. |

Primary Examiner—Jack I. Berman
Assistant Examiner—Kiet T. Nguyen
Attorney, Agent, or Firm—Oblon, Spivak, McClelland, Maier & Neustadt, P.C.

[57] ABSTRACT

A radiating apparatus, particularly an infrared radiating apparatus, having at least one radiation source which has a configuration which is broad in the direction transverse to the emission direction of interest. In order to construct a radiating apparatus which persists over a relatively long period of time in being resistant to temperature changes and which has relatively low thermal inertia, a carbon strip is provided as a radiation source. The strip includes a plurality of segments which are joined together, the ends of which segments are mounted in support members, wherewith at least the first and last of said support members are in the form of respective contacts.

10 Claims, 1 Drawing Sheet

RADIATING APPARATUS

BACKGROUND OF THE INVENTION

1. Field of the Invention

The invention relates to a radiating apparatus, particularly an infrared radiating apparatus, having at least one radiation source which is broad in the direction transverse to the emission direction of interest.

2. Description of the Related Art

The radiating apparatus disclosed in Ger. AS 17 73 336 is an Infrared (IR) radiator for use in an IR analysis apparatus. In that apparatus, a layer of resistance material is fused onto an electrically non-conducting support which is resistant to high temperatures. The support is usually a plate of argillaceous earth material, such as clay. That is, the resistance material may comprise a solidified binder and a finely distributed electrically conducting material which is dispersed in the binder in an electrically conducting proportion. The binder preferably consists of a ceramic composition, whereas the electrically conducting material is a metal.

(PCT Application) WO 92/05411 describes an IR radiation source in the form of an electrically conducting metal strip placed under tension by a tension element. The strip carries a current.

The above apparatuses are relatively costly. It is necessary to furnish the main (substrate) body of the radiation source with a coating. Moreover, the suspension of the metal strip must employ spring-loaded means in order to ensure mechanical stability over the entire temperature range of the radiating apparatus. The spring loading entails a relatively high expense, both as to the structural elements and as to their assembly.

A radiating apparatus of the above-described type is essentially limited to a low power range because heat removal takes place via the tensioning elements. Overheating results if the power is increased to an appreciably higher level with consequent potential damage to the functioning of the radiating apparatus.

Further, the above arrangements tend to suffer fatigue in the face of stresses resulting from temperature changes, thereby decreasing the service life of the radiating apparatus.

SUMMARY OF THE INVENTION

The present invention provides a radiating apparatus which has a long life, is resistant to temperature changes and has a relatively low thermal inertia.

According to the invention a radiation source includes a carbon strip comprised of a plurality of segments joined together. The ends of the segments are mounted in support members, wherein at least the first and last of said support members are electrical contacts. Carbon strips have come into increasingly wide use, particularly under conditions of large temperature changes. Even at temperatures of around 1000° C., the carbon fibers retain their stability, conduct a current, and have a high degree of emission. The reactions to changes in temperature (length changes) are compensated for by mounting the carbon strips in support members. The support members prevent undesirable stresses in the radiating apparatus.

Current conduction is improved if the ends of the segments are at least partially surrounded with graphite paper. Advantageously, the carbon strip is disposed in a wave-like, or other non-straight-line configuration. In forming a wide-source radiator, the strip is movably held by the support members which themselves are not electrical contacts (terminals). In this way, one can obtain optimal adjustment to the stresses caused by temperature changes.

In one particular embodiment, three support members are configured as contacts, wherewith, e.g., the middle contact may bisect the carbon strip. Such an arrangement enables control of the two parts of the carbon strip separately. In this connection it is advantageous if a central vane-like member is disposed between two neighboring segments of the carbon strip. Particularly, the vane between such segments is separated by a contact to shield the two separately controlled parts of the carbon strip and in order to provide two segments which have different radiation behavior. Advantageously, the central vane-like member is in the form of a shielding sheet.

It is advantageous to dispose the carbon strip between a window and a reflector, inside a housing. In this way, the radiation source is protected, and the maximum possible proportion of the radiation passes through the window and onto the irradiated object, which object may be, e.g., the cell of an analysis device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
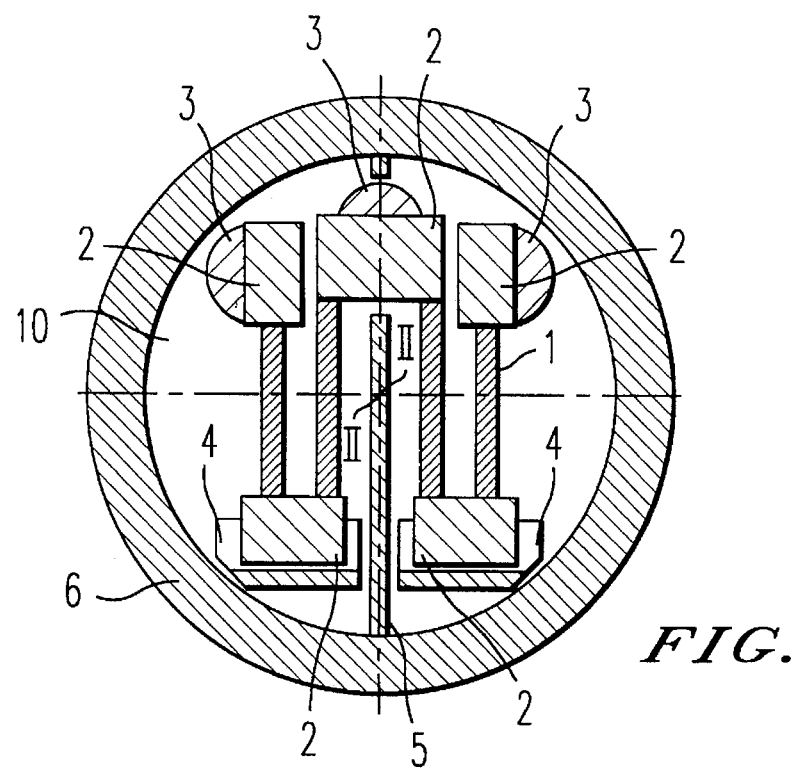
FIG. 1 is a schematic of the present invention.

Referring now to the drawings, wherein like reference numerals designate identical or corresponding parts throughout the several views, the present invention will now be discussed in regard to FIGS. 1 and 2 thereof.

Figure 2:
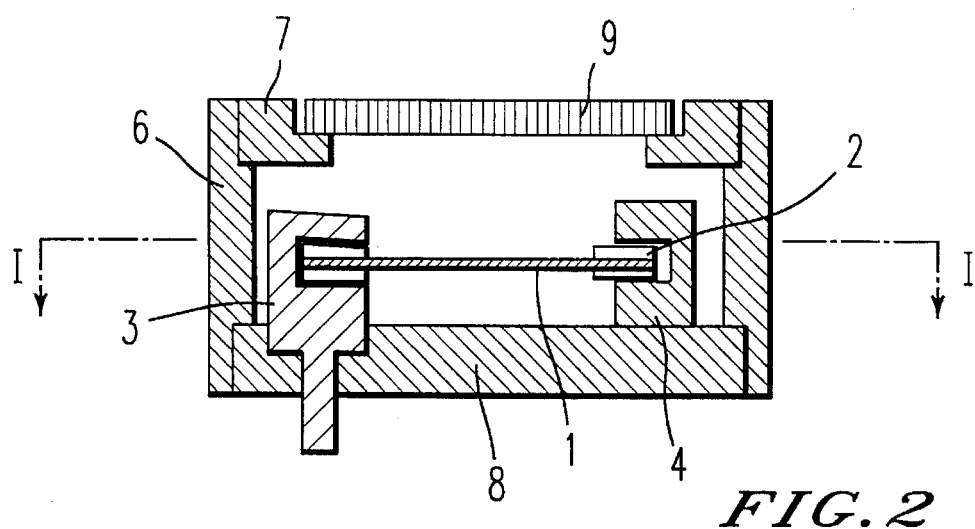
FIG. 2 is a schematic cross sectional view through the line II—II of FIG. 1.

FIG. 1 is a cross-sectional view of the radiating apparatus along lines I—I of FIG. 2. FIG. 2 is a view along lines II—II of FIG. 1.

The carbon strip 1, which may be comprised of carbon fiber, is wave-shaped (or spiraloid etc.), by virtue of having been stamped out or being constructed of strips appropriately connected together. In the contact area the current must flow transversely to the fiber direction and must therefore be assisted by the contact paper, e.g., by graphite paper 2 which has been previously applied during the preparation of the radiating apparatus. The bond between the carbon strip 1 and the graphite paper 2 is thermally stable. The current can be supplied via the graphite paper 2 and a form-interlocking connection through contacts 3. Further, the mass of the connecting elements (between segments of the carbon strip) is sufficiently small that the support 4 serves only as a means of securing the component parts during shipping, which means are desirable in view of the fact that during shipping, the component parts may be subjected to substantially higher accelerations than during operation.

It is seen from FIG. 1 that the central vane-like member divides the radiating apparatus into two halves, as is necessary in order to produce an antiphase modulation in the case of an analyzer (for analyzing chemical substances) having divided cells. The ground connection can be provided, via the middle contact, wherewith it is possible to separately control each of the radiating halves via the outer contacts. In this way, the zero point of a measuring apparatus can be adjusted without mechanical components (such as magnitude screens), and antiphase control of the radiating apparatus (and thereby antiphase modulation of the IR radiation) can be achieved.

The surface of the ceramic support 8 is glazed and either gold-plated or gold-coated, in the form of a reflector 10. Because the thickness dimension of the radiating apparatus (height of the edge member 6) can be small, preferably less than 15 mm, a large part of the radiation is emitted from the window 9 disposed in the holder 7. Thus, radiation emitted from the side facing the cell (not shown), as well as a large part of the radiation emitted from the side of the carbon strip 1 facing the reflector 10, is transferred out of the cell.

A radiation-receiving means of the measuring apparatus (not shown) effectively sees a flat radiation source. Thus, a higher parallel radiation proportion is provided by the above arrangement. For example, the radiating apparatus can be modulated up to 5 Hz with a mean power of around 10 W and a degree of modulation of around 50%.

Obviously, numerous modifications and variations of the present invention are possible in light of the above teachings. It is therefore to be understood that within the scope of the appended claims, the invention may be practiced otherwise than as specifically described herein. For example, the construction of the radiating apparatus lends itself to manufacture and is susceptible to substantial automation. This is true particularly with regard to the structuring and fabrication of the carbon strip 1 and the graphite paper 2, the fabrication of the contacts 3, and the fabrication of the housing (4,5,6,7,8). The housing has been illustrated with a complex structure only for purposes of example.

What is claimed as new and desired to be secured by Letters Patent of the United States is:

1. A radiating apparatus, comprising:
   a housing being broad in the direction transverse to an emission direction as compared with a height in the emission direction;
   a carbon strip segmented over its length by forming a plurality of segments joined together to form a radiation source within the housing;
   a plurality of support members each of which supports one end of each of said segments; and
   wherein at least a first one and a last one of said support members are electrical contacts.

2. The radiating apparatus according to claim 1 further comprising:
   graphite paper surrounding said each end of the segments.

3. The radiating apparatus according to claim 2, wherein the carbon strip is disposed in a non-straight-line configuration.

4. The radiating apparatus according to claim 3 wherein the carbon strip is movably held by the support members and said members are not electrical contacts.

5. The radiating apparatus according to claim 3, wherein said support members include three support members which are electrical contacts.

6. The radiating apparatus according to claim 2, further comprising:
   a central vane-like member disposed between two neighboring segments of the carbon strip.

7. The radiating apparatus according to claim 6, wherein the central vane-like member is disposed between two segments of the carbon strip having one end connected to a common contact.

8. The radiating apparatus of claim 7, wherein the contact in common is connected to ground and the two segments are electrically driven separately.

9. The radiating apparatus according to claim 7, wherein the central vane-like member is in the form of a shielding sheet.

10. The radiating apparatus according to claim 9, further comprising:
    a reflector for reflecting radiation;
    a window for emitting the radiation from the radiating apparatus; and
    wherein, the carbon strip is disposed between the window and the reflector and the radiation is reflected from the reflector toward the window.

* * * * *